Figure 1:
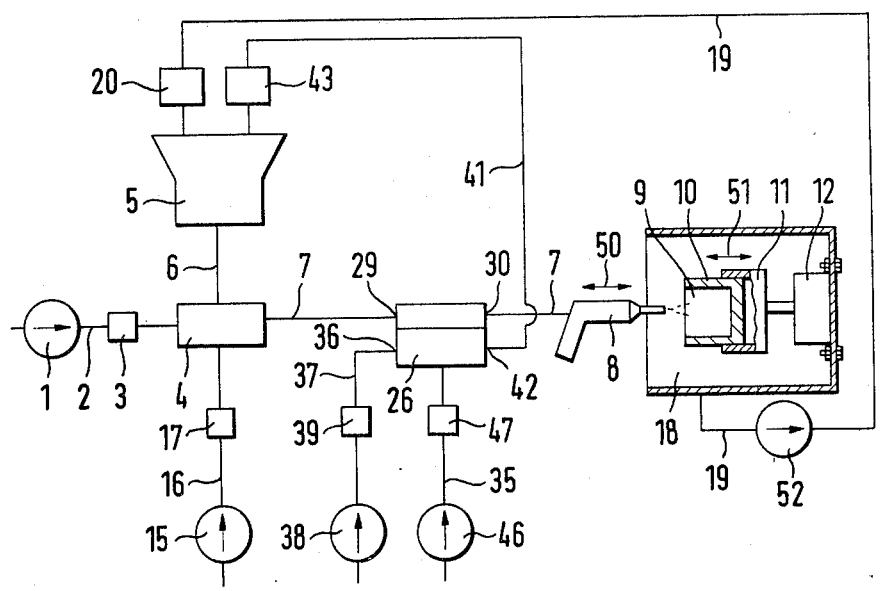

United States Patent [19]

Moos

[11] 4,314,669
[45] Feb. 9, 1982

[54] METHOD FOR SPRAYING POWDERED TO GRANULAR BULK MATERIAL

[75] Inventor: Kurt Moos, Wil, Switzerland

[73] Assignee: Gema AG, Switzerland

[21] Appl. No.: 93,636

[22] Filed: Nov. 13, 1979

[30] Foreign Application Priority Data

Nov. 14, 1978 [DE] Fed. Rep. of Germany ....... 2849269

[51] Int. Cl.³ ................................................ B05D 1/12
[52] U.S. Cl. ........................................ 239/1; 239/124;
118/312; 118/326; 406/106; 406/181; 427/195;
427/345; 427/421
[58] Field of Search ............... 406/181, 106; 239/124,
239/125, 1; 118/312, 326; 427/195, 345, 328,
421

[56] References Cited

U.S. PATENT DOCUMENTS

| | | | |
|---|---|---|---|
| 3,558,052 | 1/1971 | Dunn | 239/124 X |
| 3,696,780 | 10/1972 | Fritzsche | 118/312 |
| 3,720,533 | 3/1973 | Gallagher | 427/195 X |
| 3,901,184 | 8/1975 | Payne et al. | 118/312 |
| 3,982,050 | 9/1976 | Kato et al. | 427/195 |
| 4,109,027 | 8/1978 | Crose | 427/28 |

Primary Examiner—Shrive P. Beck
Attorney, Agent, or Firm—Ostrolenk, Faber, Gerb & Soffen

[57] ABSTRACT

A method for spraying a powdered to granular bulk material is disclosed in which a stream of propellant gas is mixed with the bulk material and the mixture is sprayed by a suitable known spraying device. Unwanted clogging of conduits and wastage of the bulk material are prevented by rerouting the flow of the bulk-material/gas mixture at a point upstream from the spray device whenever it is desired to interrupt spraying. A device for effecting this method is also disclosed.

5 Claims, 2 Drawing Figures

METHOD FOR SPRAYING POWDERED TO GRANULAR BULK MATERIAL

BACKGROUND OF THE INVENTION

The present invention relates to a method and a device for spraying powdered to granular bulk material, particularly for the spray-coating of articles, in which the bulk material is fed from a storage container to a spray device by a main stream of propellant gas as a bulk-material/gas mixture.

Pneumatic spray devices for the spray-coating of articles are known from German Pat. No. 1,266,685, which shows in particular a pneumatic conveyor device which, in accordance with the diffuser or Venturi principle, produces a vacuum for drawing the bulk material through a stream of propellant gas. A spray device for spray-coating in an electrostatic field, suitable for the spraying of bulk material, is known from Swiss Pat. No. 429 517 and from U.S. Pat. No. 4,033,506.

Upon the spray coating of flat articles in an electrostatic field, these articles are transported continuously in boxes on a belt past a spray device. For the spray-coating of hollow articles, it may be necessary to clamp them individually in a turning device and to turn them during the spray-coating. Frequently the spray device must be moved into the hollow space of said articles so that the bulk material sufficiently coats all surfaces in the hollow space. The excess bulk material which does not adhere to the articles is drawn by suction out of the box, cleaned and returned in dosaged quantity to the storage container. The suction device must be of very great power so that a sufficient suction effect can be produced throughout the entire volume of the box. The cleaning of the excess bulk material must be very thorough, since even the smallest traces of impurity from the air make the articles unusable. Even after careful cleaning, the excess bulk material may still contain impurities. Therefore, it must be returned in each case only in small metered quantity to the powder containers.

Upon disconnecting the mainstream of propellant gas, as is necessary for instance in order not to spray any bulk material between the individual articles, the conduits remain filled with bulk material. When the stream of propellant gas is again turned on, the bulk material which has remained in the conduits is discharged in a surge from the spray device, after which the latter can again spray in normal manner. This surge of bulk material must not reach the articles to be coated. Therefore the feed of the bulk material must either not be disconnected between the individual articles or upon reconnection, the spray must at first be directed against a screening wall and this wall, after the surge has blown away, then be removed from the spray jet path. This is time-consuming and cumbersome and a relatively large amount of bulk material is lost or must be purified for reuse.

SUMMARY OF THE INVENTION

The object of the present invention is to reduce these losses of time, material and energy.

In order to achieve this purpose, the method of the invention is characterized by the fact that the flow of bulk material/gas mixture is from time to time diverted at a point upstream of the spray device and the bulk material in the diverted portion of the mixture is returned to the storage container in which the bulk material is stored.

The pneumatic spray device of the invention for carrying out this method is characterized by the fact that upstream of the spray device a branching means is provided in order to divert the bulk-material/gas mixture and return the diverted bulk material into the storage container.

In accordance with the invention, therefore, when a brief interruption of the delivery of the bulk material is desired, the flow of propellant gas and bulk material is not interrupted, but rather the bulk material feed is branched-off upstream of and as close as possible to the spray device. In this way no bulk material can be deposited in the conduits. When spraying is then to be resumed diversion of the flow is terminated, and the stream of bulk-material/gas mixture which has continued uninterrupted is again fed to the spray device.

In this way it is possible to interrupt the spray process between the individual articles to be coated. In this way no bulk material is lost while the spraying is shifted from one article to another article. In the spray-coating of cavities, for instance in the case of cups, cans, etc., it is possible to limit the delivery of the bulk material in each case to when the spraying device is in position inside the cavity. It has been found in tests that practically no atomized bulk material any longer drops out of the cavity in this case. This means that in such cases it is possible to dispense completely with an expensive highly energy-consuming suction device for the removal of such bulk material from the box.

In accordance with the invention, in order to branch the mixture of bulk material and gas off upstream of the spray device there may be used a pneumatic conveyor device having a vacuum generator operating in accordance with the diffuser or Venturi principle. Such a conveyor device can also be employed for the drawing of the bulk material out of the storage container and into the main stream of propellant gas. This results on the one hand in optimal operation of the pneumatic spray device and on the other hand saves money by allowing use of identical pieces of equipment for several functions.

Further features of the invention will become evident from the following description and claims.

BRIEF DESCRIPTION OF THE FIGURES

One embodiment of the invention will be described below by way of example with reference to the drawings, in which:

FIG. 1 is a schematic diagram of a pneumatic spray device in accordance with the invention and FIG. 2 is a diagrammatic longitudinal section through a pneumatic branching device in accordance with the invention.

DESCRIPTION OF THE PREFERRED EMBODIMENT

In FIG. 1, a main stream of propellant gas is fed from a pressure source 1 through a gas conduit 2 containing a pressure regulator 3 to a pneumatic conveyor device 4. In this conveyor device 4, the main stream of propellant gas produces in a known manner, according to the diffuser or Venturi principle, a vacuum by which powdered to granular bulk material is drawn in from a storage container 5 via a bulk-material conduit 6. This bulk material which has been drawn in is fed by the main stream of propellant gas via a conveyor conduit 7 to a spray device 8 which sprays the bulk material on the interior surface of a cavity 9 of an article 10 which is to be coated. The article 10 is held by a holding device 11 and is turned by a motor 12 during the spraying. FIG. 1 shows the position of rest in which the article 10 can be replaced. For the coating of the cavity 9 the spray device 8 is moved into the cavity 9. This can be done either by axial displacement of the spray device 8 or by displacement of the article 10 together with the holding device 11.

The propellant gas from the source of pressure 1 is preferably fed with constant pressure to the conveyor device 4. An adjustment or change of the flow rate of bulk material required for the coating is preferably effected by introducing control gas into the vacuum region of the conveyor device 4 from another source of pressure 15 via a control line 16 in which a setting device 17 is contained. In this way the vacuum can be reduced in the vacuum region, which results in a lesser suction effect and thus also a smaller amount of bulk material being drawn in from the container 5.

The coating of the article 10 is effected in a box 18. Excess bulk material which drops into box 18 is fed via a return line 19 to a cleaning device 20 and fed by the latter in cleaned condition to the storage container 5.

Figure 2:
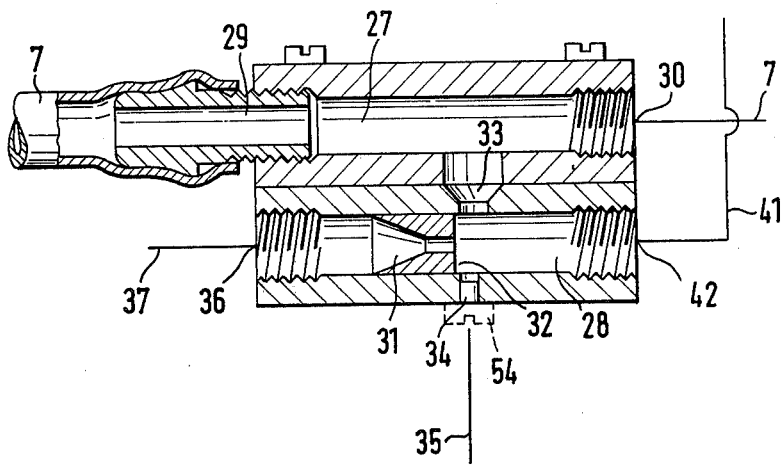

A branching device 26 is located in the conveyor conduit 7 as close as possible upstream of the spray device 8. As shown by the longitudinal section in FIG. 2, the branching device 26 contains two passage channels 27 and 28. The upper channel 27 contains an inlet 29 and an outlet 30 for the conveyor conduit 7. The lower channel 28 corresponds in its construction substantially to the pneumatic conveyor device 4. In both cases a diffuser or Venturi section 31 is provided adjoining which in direction of flow there is a vacuum region 32. The vacuum region 32 of the channel 28 is connected via a suction line 33 with the adjacent channel 27. A connecting bore hole 34 for a control-gas conduit 35 also communicates with the vacuum region 32.

At the inlet 36 of the channel 28 a source of pressure 38 for additional propellant gas is connected via the gas conduit 37. In this additional gas conduit 37 there is a device 39, for instance a pressure regulator, for the connecting and disconnecting of the gas feed, which device 39 can also serve for regulating the gas pressure.

When the additional stream of propellant gas is turned on, it draws the bulk-material/gas mixture out of the channel 27 into the vacuum region 32 via the suction line 33 and conveys it via a return line 41, connected to its outlet 42, to a cleaning device 43 which then returns the bulk material to the storage container 5. In most cases, the cleaning device 43 is unnecessary so that the bulk material can be returned via the conduit 41 directly into the container 5. If no additional stream of propellant gas is present in the channel 28, then the bulk-material/gas mixture of the channel 27 is fed directly to the spray device 8. Only when it is desired to interrupt the spray process, for instance during a change from one article to be coated to another is the additional stream of propellant gas passed through the conduit 28 and the bulk-material/gas mixture thus withdrawn from the channel 7 so that it cannot arrive at the article 10.

Instead of an interruption in the stream of supplementary propellant gas of conduit 37, it is also possible to introduce into the vacuum region 32 via the contral gas conduit 35 sufficient control gas to eliminate the vacuum in region 32 to allow the stream of bulk-material/gas mixture to pass unimpeded through the channel 27 to the spray device 8. However in most cases this is an unnecessary additional expenditure of gas. Accordingly, the control gas conduit 35 is frequently omitted and the connecting bore-hole 34 is closed (closure plug 54 indicated by the dashed line). The pressure sources 1, 15, 38 and 46 may be a common compressed-gas network with corresponding branchings. As the gas, air is suitable in most cases. This however does not exclude the possibility of using other gases in special cases.

When the spray device 8 or the article 10 can be displaced in the direction indicated by the arrows 50 and 51, respectively, it is possible in accordance with the spray method of the invention to limit spraying of bulk material to when the spray nozzle of the device 8 is located within the cavity 9. Experiments have shown that in this case no bulk material is lost, so that the return line 19 with the cleaning device 20 and strong suction apparatus 52 can be dispensed with. Losses in bulk material can be avoided particularly well and at the same time good coatings obtained if the article 10 is turned during the spray process by the motor 12 with a suitable speed of rotation.

I claim:

1. A method of spraying powdered material, comprising the steps of:
- mixing a stream of a propellant gas and a powdered material to form a powdered-material/gas mixture; spraying the mixture;
- periodically diverting the flow of the mixture to terminate said spraying by means of suction; and terminating the diversion of the mixture to reinitiate spraying.

2. The method of claim 1, wherein said diverting step further comprises the steps of: producing a vacuum by means of a second stream of gas; and applying said vacuum to the flow of the mixture, thereby diverting the flow by means of suction.

3. The method of claim 2, further comprising the steps of:
- producing a vacuum by means of the first stream of propellant gas; and
- drawing the powdered material from a source thereof for mixing with the propellant gas by means of applying the vacuum to the powdered material source.

4. The method of claim 1, comprising the further step of returning the powdered material in the diverted portion of the mixture to the powdered material source.

5. The method of claim 4, wherein said returning step comprises the further step of cleaning the diverted powdered material prior to returning it to the powdered material source.

* * * * *